US009014068B2

(12) United States Patent
Linehan et al.

(10) Patent No.: US 9,014,068 B2
(45) Date of Patent: Apr. 21, 2015

(54) ANTENNA HAVING ACTIVE AND PASSIVE FEED NETWORKS

(75) Inventors: Kevin Eldon Linehan, Rowlett, TX (US); Jonas Aleksa, Exeter, NH (US); Martin Weckerle, Rosenheim (DE)

(73) Assignee: CommScope Technologies LLC, Hickory, NC (US)

(*) Notice: Subject to any disclaimer, the term of this patent is extended or adjusted under 35 U.S.C. 154(b) by 502 days.

(21) Appl. No.: 13/270,628

(22) Filed: Oct. 11, 2011

(65) Prior Publication Data

US 2012/0087284 A1 Apr. 12, 2012

Related U.S. Application Data

(60) Provisional application No. 61/391,507, filed on Oct. 8, 2010.

(51) Int. Cl.

| | |
|---|---|
| ***H04L 5/00*** | (2006.01) |
| ***H01Q 3/30*** | (2006.01) |
| ***H01Q 1/24*** | (2006.01) |
| ***H01Q 3/26*** | (2006.01) |
| ***H01Q 21/00*** | (2006.01) |

(Continued)

(52) U.S. Cl.

CPC ................. *H01Q 3/30* (2013.01); *H01Q 1/246* (2013.01); *H01Q 3/26* (2013.01); *H01Q 21/0025* (2013.01); *H01Q 21/26* (2013.01); *H01Q 25/00* (2013.01)

(58) Field of Classification Search

CPC .............. H01Q 1/00; H01Q 3/00; H04L 5/06; H04L 5/08

USPC ........... 370/297; 343/700, 843, 850, 853, 858

See application file for complete search history.

(56) References Cited

U.S. PATENT DOCUMENTS

| | | | | |
|---|---|---|---|---|
| 5,745,079 | A * | 4/1998 | Wang et al. | 343/700 MS |
| 6,043,790 | A | 3/2000 | Derneryd | |
| 2002/0090974 | A1* | 7/2002 | Hagn | 455/552 |

(Continued)

FOREIGN PATENT DOCUMENTS

| | | |
|---|---|---|
| CN | 1250549 | 4/2000 |
| CN | 2514507 | 10/2002 |

(Continued)

OTHER PUBLICATIONS

International Search Report for related and written opinion for related PCT App. No. PCT/US2011/055813 dated Feb. 8, 2012.

(Continued)

*Primary Examiner* — Noel Beharry
*Assistant Examiner* — Kodzovi Acolatse
(74) *Attorney, Agent, or Firm* — Husch Blackwell LLP

(57) ABSTRACT

An antenna having a passive feed network in one band, and an active radio network in an adjacent band, is provided. The antenna includes radiating elements arranged in an array dimensioned to transmit and receive RF signals. The antenna includes diplexers having a first port, a second port and a third port. The first port of each diplexer coupled to at least one radiating element. The diplexer has a first filter coupling the first port to the second port and a second filter coupling the first port to the third port. A passive feed network includes a phase shifter, which is coupled to an input transmission line and a plurality of output transmission lines. Each of the output transmission lines may be coupled to one of the second ports of one of the diplexers. An active radio is coupled to each of the third ports of the plurality of diplexers.

12 Claims, 4 Drawing Sheets

(51) Int. Cl.
*H01Q 21/26* (2006.01)
*H01Q 25/00* (2006.01)

(56) References Cited

U.S. PATENT DOCUMENTS

| | | | | |
|---|---|---|---|---|
| 2003/0052828 | A1 | 3/2003 | Scherzer et al. | |
| 2009/0286501 | A1 | 11/2009 | Rousu et al. | |
| 2011/0128092 | A1 * | 6/2011 | Fritz et al. | 333/133 |
| 2011/0156974 | A1 | 6/2011 | Kenington et al. | |
| 2011/0159808 | A1 | 6/2011 | Kenington et al. | |
| 2011/0159810 | A1 | 6/2011 | Kenington et al. | |
| 2011/0291773 | A1 * | 12/2011 | Tong et al. | 333/205 |
| 2011/0305174 | A1 * | 12/2011 | Hensley et al. | 370/297 |

FOREIGN PATENT DOCUMENTS

| | | | |
|---|---|---|---|
| WO | WO 98/43315 | A1 | 10/1998 |
| WO | WO 02/07254 | A1 | 1/2002 |

OTHER PUBLICATIONS

PCT International Written Opinion for related app. No. PCT/US2011/055813 dated Apr. 9, 2013.

Office Action regarding companion Chinese Application No. 201180042854.0, dated Dec. 11, 2014 (8pgs.).

English summary of Office Action regarding companion Chinese Application No. 201180042854.0, dated Dec. 11, 2014 (5pgs.).

* cited by examiner

ANTENNA HAVING ACTIVE AND PASSIVE FEED NETWORKS

This application claims priority to and incorporates by reference U.S. Provisional Patent Application No. 61/391,507 filed Oct. 8, 2010 and titled "Passive Antenna And Feed Network"

BACKGROUND

Dual band antennas for wireless voice and data communications are known. For example, common frequency bands for GSM services include GSM900 and GSM1800. GSM900 operates at 880-960 MHz, and GSM1800 operates in the frequency range of 1710-1880 MHZ. Antennas for communications in these bands of frequencies typically include an array of radiating elements connected by a feed network. For efficient transmission and reception of Radio Frequency (RF) signals, the dimensions of radiating elements are typically matched to the wavelength of the intended band of operation. Because the wavelength of the 900 MHz band is longer than the wavelength of the 1800 MHz band, the radiating elements for one band are typically not used for the other band. In this regard, dual band antennas have been developed which include different radiating elements for the two bands.

In these known dual band antennas, the radiating elements of the GSM1800 Band may be interspersed with radiating elements of the GSM900 Band, or nested within the radiating elements of the GSM900 band, or a combination of nesting and interspersing. See, e.g., U.S. Pat. No. 7,283,101, FIG. 12; U.S. Pat. No. 7,405,710, FIG. 1, FIG. 7. Such nesting and interspersing is achievable, in part, because the radiating elements for the GSM1800 Band do not unduly interfere with the radiating elements for the GSM900 Band and vice-versa.

However, this known solution is not acceptable when high and low bands are sufficiently close in frequency so that coupling occurs between the arrays of radiating elements. Also, multiple radiating elements occupy additional area in an antenna, and add to the costs of an antenna.

SUMMARY

An antenna having a passive feed network in one band, and an active radio network in an adjacent band, is provided herein. The antenna includes plurality of radiating elements arranged in an array. The radiating elements are dimensioned to transmit and receive RF signals, for example, in a band of 790 MHz to 960 MHz. The antenna includes a plurality of diplexers having a first port, a second port and a third port. The first port of each diplexer coupled to at least one radiating element. The diplexer has a first filter coupling the first port to the second port and a second filter coupling the first port to the third port. In one example, involving the GSM900 band, the first filter is a band pass filter having a pass band of 790-862 MHz and the second filter is a band pass filter having a pass band of 880-960 MHz. Other pass bands would be used when the invention is applied to different communications bands. A passive feed network includes a phase shifter, which is coupled to an input transmission line and an plurality of output transmission lines. Each of the output transmission lines may be coupled to one of the second ports of one of the diplexers. An active feed network comprising a plurality of active radios is also included. An active radio is coupled to each of the third ports of the plurality of diplexers.

In a further example, the active feed network further includes a duplexer. The active radio further comprises a transmitter and a receiver. A common port of the duplexer is coupled to the third port of one of the plurality of diplexers, a transmit port of the duplexer is coupled to the transmitter, and a receive port of the duplexer is coupled to the receiver.

In another example, at least one of the plurality of diplexers is a modified diplexer having a fourth port and a fourth filter coupling the first port to the fourth port. The fourth filter is substantially the same as the third filter. An active radio is coupled to the fourth port of the modified diplexer. In another example, the plurality of radiating elements is greater than the plurality of output transmission lines from the phase shifter of the passive feed network.

DETAILED DESCRIPTION

Figure 1:
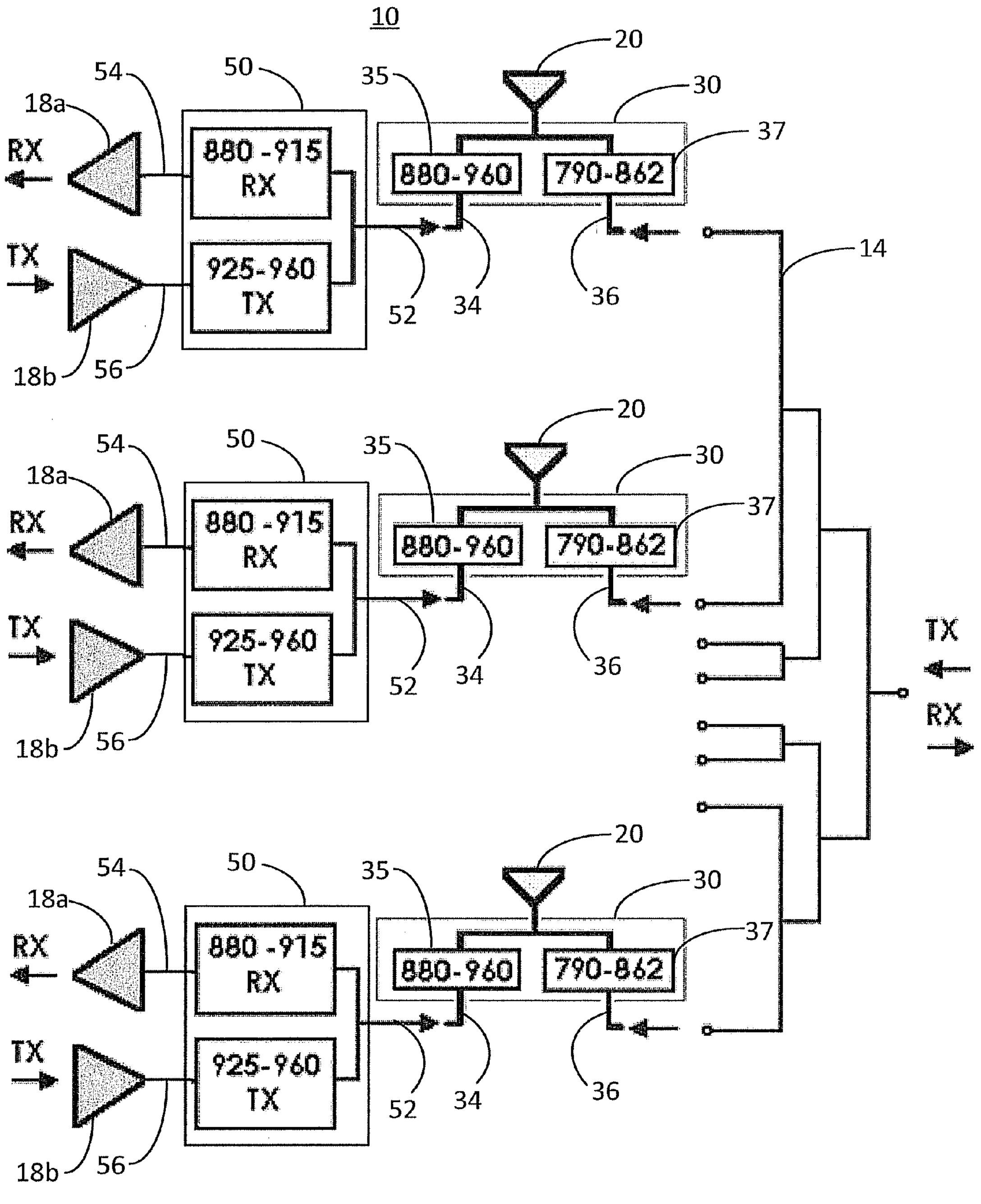
FIG. 1 is a schematic diagram of a first example of the present invention.

In a first example of an antenna 10 of the present invention, an array of radiating elements 20 are associated with both a first band, fed by a single radio and amplifier (not illustrated) via a passive feed network 14, and a second band, fed by an active feed network 16 comprising a plurality of active radios 18, including receivers 18*a* and transmitters 18*b*.

Figure 2:
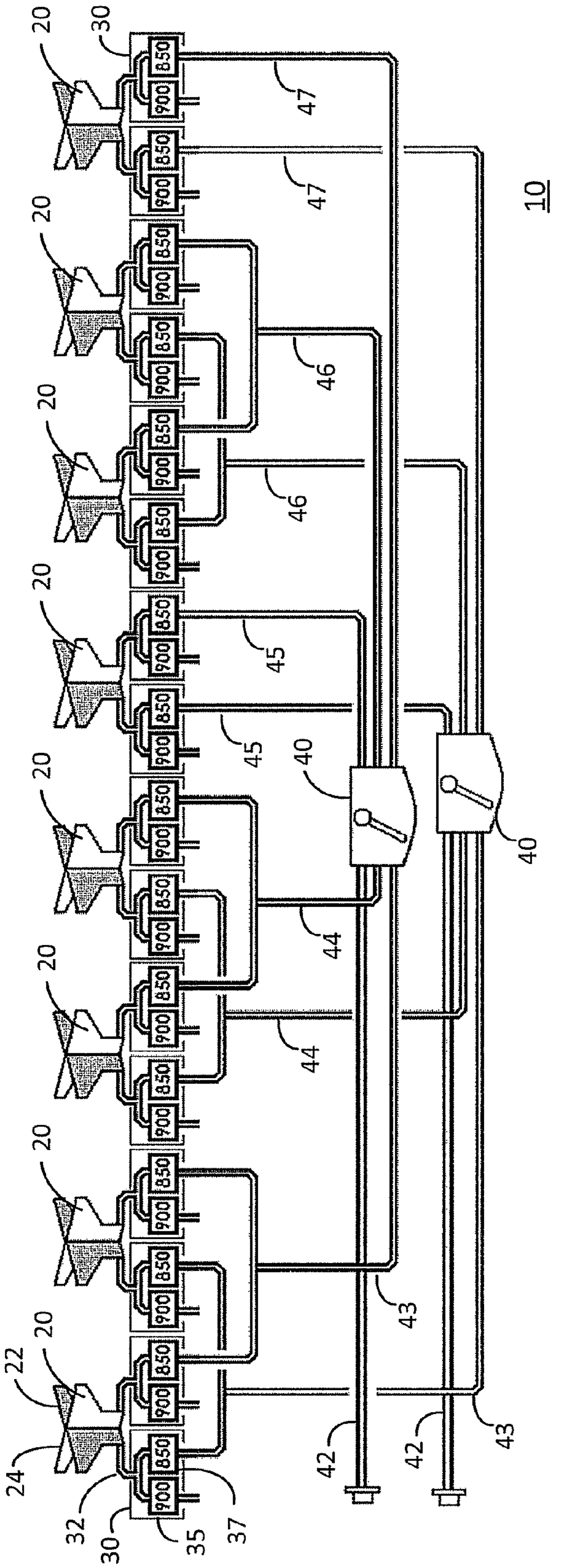
FIG. 2 is a diagram of an antenna of the first example, including a passive feed network.

Referring to FIGS. 1 and 2, a plurality of radiating elements 20 may be arranged in an array. In the illustrated examples, the array is linear, but other topologies are contemplated for use with the invention. In one example, the radiating elements 20 comprise cross polarized elements that are dimensioned so as to optimize radiating and receiving radio frequency signals in the range of about 790 MHz to 960 MHz. The radiating elements 20 may comprise a first dipole 22 and a second dipole 24, where the first dipole 22 and the second dipole 24 are angled 45 degrees with respect to vertical, to achieve+/−45 degree polarization. Other types of radiating elements may also be suitable, for example, box dipole and microstrip annular ring radiating elements may also be used. Additionally, polarizations other than +/−45 degree polarized may also be employed, and single or circular polarization radiating elements may be employed.

For clarity, in FIG. 1, only three of the radiating elements 20 and associated components are illustrated. Also, in FIG. 2, the active feed network 16 is not illustrated.

Coupled to each dipole is a low loss diplexer 30. The diplexer 30 has a combined port 32, a high port 34 and a low port 36. The high port 34 is coupled to a dipole (either a first dipole 22 or a second dipole 24). The low port 36 may be coupled to a low band pass filter 37, and the high port 34 may be coupled to a high band pass filter 35. The high band pass filter 37 may have a pass band of 880-960 MHz, and the low band pass filter may have a pass band of 790-862 MHz.

Figure 4:
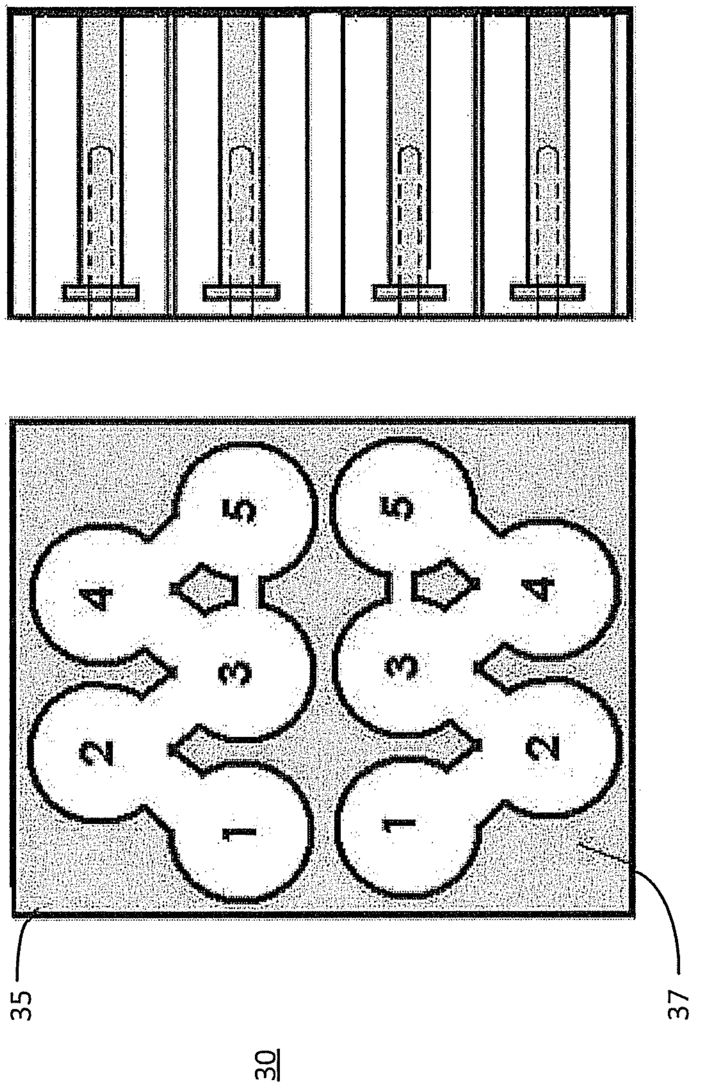
FIG. 4 is a drawing a diplexer that may be used in the different examples of the present invention.

An example of a low-loss diplexer is illustrated in FIG. 4. The high band pass filter 35 and the low band pass filter 37 each comprise a 5-1 resonant cavity structure. The cavity may be 30 mm in diameter and 45 mm in length. This structure has 30 dB rejection and 0.5 dB insertion loss. Alternatively, the low port 36 may be coupled to a low pass filter and the high port 34 may be coupled to a high pass filter. Alternatively, band stop filters may be employed in the diplexer. Also, while the examples herein are described as having the active feed network 16 coupled to the high port 34 and the passive feed network 14 being coupled to the low port 36, the opposite arrangement is also contemplated and is within the scope of the invention, e.g., the active feed network 16 coupled to the low port 36 and the passive feed network 14 coupled to the high port 34. Additionally, while the example is described with respect to the GSM 900 band, the invention may be applied to other frequency bands. For example, the invention could be applied to the GSM 1800 band or, in another example, the low band could be the 1900 MHz band and the high band could be the 2600 MHz band.

The low band pass filter 37 allows frequencies in the range of 790 MHz-862 MHz to pass through the low port 36 to the combined port 32. Also, the low band pass filter 37 allows frequencies in the same range to pass from the combined port 32 to the low port 36. However, the low band pass filter 37 blocks frequencies in the range 880 MHz-900 MHz from passing from the combined port 32 to the low port 36. The high band pass filter 35 allows frequencies in the range of 880 MHz-900 MHz to pass through between the high port 34 and the combined port 32 in either direction, but blocks frequencies in the range of 790 MHz-862 MHz from passing from the combined port 32 to the high port 34. This arrangement allows the radiating element 20 coupled to the combined port 32 to be shared by distinct feed networks operating in adjacent frequency bands.

In the example of FIG. 2, the low port 36 of each diplexer 30 is coupled to the passive feed network 14. In the example illustrated in FIGS. 2 and 3, there are two passive feed networks 14; one is associated with the first dipole elements 22 and one is associated with the second dipole elements 24. In an alternate example, a single polarized array may be used with a single passive feed network. The passive feed network 14 comprises a phase shifter 40 coupled to input transmission line 42, first output transmission line 43, second output transmission line 44, third output transmission line 45, fourth output transmission line 46 and fifth output transmission line 47. The transmission lines 42-47 may be coaxial cables, air microstrip, printed circuit board traces, or a combination of these structures or alternate transmission line structures. While the transmission lines are termed "input" ad "output" with respect to the transmit direction of signal flow, a person of skill in the art would recognize that the passive feed network 14 exhibits reciprocity, and the signal flow would be in the opposite direction for received RF signals. A phase shifter 40 is included in the passive feed network 14 to permit the relative phases of the radiating elements 20 to be varied to enable steering of the radiation pattern of the array of radiating elements. Typically, the passive feed network 14 would be coupled to a Low Noise Amplifier. Examples of passive feed networks may be found in, for example, U.S. Pat. No. 7,986,973, U.S. Pat. No. 7,518,552, and U.S. Patent Pub. No. 2011/0063049 A1, the disclosures of which are incorporated by reference.

In the example of FIGS. 1 and 2, the high port 34 of each diplexer 30 is coupled the active feed network 16. In the illustrated example, the high port 34 of the diplexer 30 is coupled to a combined port 52 of a duplexer 50. The duplexer 50 isolates received radio frequency signals from transmitted radio frequency signals. Referring to FIG. 1, a receive port 54 of the duplexer 50 is coupled to a radio receiver 18*a*, and a transmit port 56 of the duplexer 50 is coupled to a radio transmitter 18*b*. The duplexer 50 prevents the radio transmitter from interfering with received radio signals at the radio receiver.

A plurality of such radio transmitters and receivers are present in the active feed network 16. In one example, each radiating element is associated with a radio transmitter and a radio receiver. A radio receiver/transmitter pair in the active radio feed network 16 comprises an active radio 18. In alternate examples, more than one radiating element may be coupled to an active radio 18. Each active radio 18 may operate at a different phase angle with respect to other active radios 18 in the active radio feed network 16, the phase angles of the individual radiating elements 20 may be adjusted across the array without the need for an electro-mechanical phase shifter 40.

Figure 3:
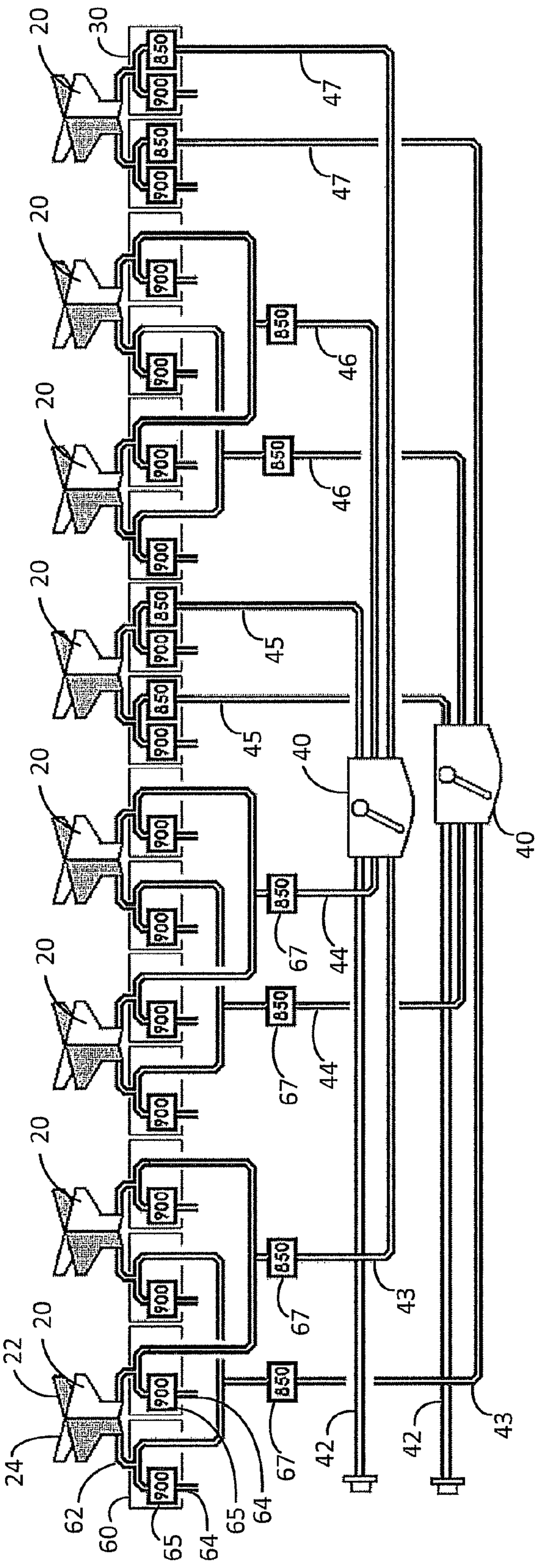
FIG. 3 is a diagram of an antenna according to a second example of the present invention, including a passive feed network.

In the example of FIG. 2, there is one diplexer 30 associated with each dipole 22, 24 of each radiating element 20. For an eight element, cross polarized array, that means that 16 diplexers 30 are present in the example of FIG. 2. An alternate example is illustrated in FIG. 3. In this example, there are also eight cross-polarized elements 20. However, there are four full diplexers 30 and twelve modified diplexers 60. The modified diplexers 60 have a combined port 62, a low port 64, and two high ports 64. The modified diplexers 60 are used with the radiating elements 20 that are associated with a common output of the phase shifter 40 of the passive feed network 14.

For example, in the illustration of FIG. 3, the phase shifter 40 has five outputs coupled to eight radiating elements 20. A first output of the phase shifter 40 is coupled to the low port 66 of the modified diplexer 60 via transmission line 43. A low band pass filter 67 coupled the low port 66 to the combined port 62. The combined port 62 of the modified diplexer 60 is coupled to two radiating elements 20. Thus, both of these radiating elements 20 operate at the same phase delay with respect to the input to the passive feed network 14. The combined port 62 of the modified diplexer 60, however, is coupled to two high band filters 65, creating two high ports 64. The high band filters may have substantially the same band pass and insertion loss characteristics. The 5 to 1 phase shifter 40 and use of the modified diplexers 60 results in a lower cost antenna and a lighter weight antenna.

Each high port 64 is associated with a different active radio 18 in the active radio feed network 16, which may be configured to operate at different phase delays. Thus the radiating elements 20 associated with a modified diplexer 60 may operate at different phase delays relative to each other with respect to the active radio feed network 16. In this example, the radiating elements 20 may receive different phase information from the active radio feed network 16, while receiving common phase information from the passive feed network 14.

While an eight element array and a 1 to 5 phase shifter are illustrated, this alternate example is not limited to such quantities. The phase shifter 40 may be a 1 to 2 phase shifter, 1 to 7 phase shifter or have any number of outputs (e.g., 1 to N). Additionally, the array may have greater or fewer than eight radiating elements 20.

In another alternate example of the invention, portions of the diplexer 30 or modified diplexer 60 may be integrated into the diplexer 50. In this example, some or all of the filtering performed by the high band pass filter 35 may be included in the diplexer 50. This would simplify the construction of the diplexer 30 or modified diplexer 60.

What is claimed is:

1. An antenna, comprising:

a. a plurality of cross polarized radiating elements arranged in an array, the cross polarized radiating elements having a first polarization at +45 degrees and a second polarization at −45 degrees;

b. a plurality of diplexers having a first port, a second port and a third port; the first port of each diplexer coupled to one of the first and second polarizations of at least one cross polarized radiating element; the diplexer having a first filter defining a first pass band coupling the first port to the second port and a second filter defining a second pass band coupling the first port to the third port;

c. a first polarization bidirectional passive feed network and a second polarization bi-directional passive feed network, each passive feed network configured to be coupled to a single radio operating in the first pass band, each passive feed network comprising a phase shifter coupled to an input transmission line and an plurality of output transmission lines, where an output transmission line is coupled to each of the second ports of the plurality of diplexers;

d. a plurality of first polarization duplexers and a plurality of first polarization duplexers, each of the plurality of duplexers having a common port, a transmit port, and a receive port, wherein the common port is coupled to one of the third ports of one of the diplexers;

e. an active feed network comprising a plurality of active radios, operating in the second pass band and capable of operating at different phase angles with respect to each other wherein each active radio is has a transmitter coupled the transmit ports of a first polarization duplexer and a second polarization duplexer, and a receiver coupled to the receive ports of a first polarization duplexer and a second polarization duplexer.

2. The antenna of claim 1, wherein at least one of the plurality of diplexers further comprises a modified diplexer having a fourth port and a fourth filter coupling the first port to the fourth port, where the fourth filter is the same as the third filter, and wherein a common port of one of the plurality of duplexers is coupled to the fourth port of the modified diplexer.

3. The antenna of claim 1, wherein the first filter comprises a low band pass filter and the second filter comprises a high band pass filter.

4. The antenna of claim 1, wherein at least one second filter of one of the pluralities of diplexers is at least partially integrated into a corresponding duplexer of the plurality of duplexers.

5. An antenna, comprising:

a. a plurality of cross polarized radiating elements arranged in an array, the cross polarized radiating elements having a first polarization at +45 degrees and a second polarization at −45 degrees;

b. a plurality of first band pass filters having a first pass band coupled to the first and second polarizations of the plurality of cross polarized radiating elements, at least one of first band pass filters being coupled to more than one radiating element of the plurality of radiating elements thereby forming a sub-array;

c. a first polarization bi-directional passive feed network and a second polarization bi-directional passive feed network, each passive feed network configured to be coupled to a single radio operating in the first pass band, each passive feed network comprising a phase shifter coupled to an input transmission line and a plurality of output transmission lines, wherein the plurality of output transmission lines are coupled to the plurality of radiating elements via the first band pass filters;

d. a plurality of second band pass filters having a second pass band coupled to the radiating elements; and e. an active feed network comprising a plurality of active radios operating in the second pass band and being capable of operating at different phase angles from each other, where each of the plurality of active radios is coupled to the first and second polarizations of a radiating element of the plurality of radiating elements via a second band pass filter of the plurality of second band pass filters.

6. The antenna of claim 5, wherein the active feed network further comprises a plurality of duplexers and each of the active radios further comprises a transmitter and a receiver, and wherein a common port of the duplexer is coupled to the third port of one of the plurality of diplexers, a transmit port of the duplexer is coupled to the transmitter, and a receive port of the duplexer is coupled to the receiver.

7. The antenna of claim 5, wherein the plurality of radiating elements is greater than the plurality of output transmission lines.

8. The antenna of claim 5, wherein each first band pass filter comprises a low band pass filter and each second band pass filter comprises a high band pass filter.

9. The antenna of claim 5, wherein each first band pass filter has a pass band of 790-862 MHz and each second band pass filter has a pass band of 880-960 MHz.

10. The antenna of claim 5, wherein the radiating elements further comprise first dipole elements and second dipole elements, and there is a first band pass filter corresponding to each of the first and second dipole elements.

11. The antenna of claim 5, wherein the plurality of active radios is equal to the plurality of radiating elements.

12. The antenna of claim 11, wherein more than one active radio is coupled to a sub-array of the passive feed network.

* * * * *